R. LOCKWOOD.
India-Rubber Surgical Tube.
No. 204,905. Patented June 18, 1878.
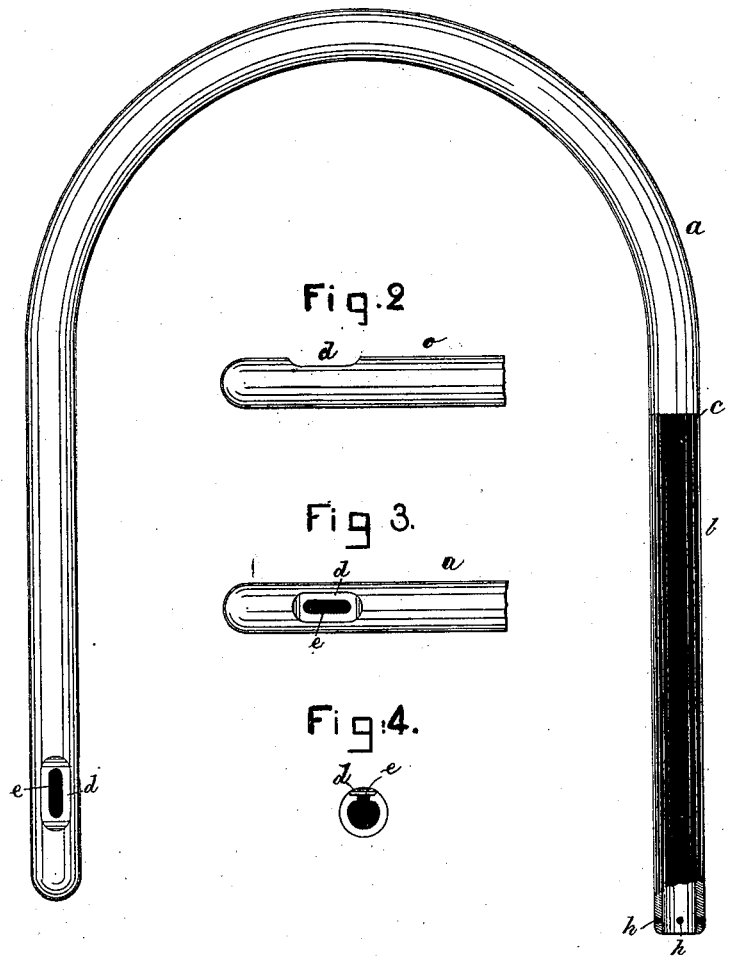
Witnesses
L. F. Connor
N. C. Whitney.
Inventor.
Rhodes Lockwood.
By Crosby & Gregory, Attys

UNITED STATES PATENT OFFICE.

RHODES LOCKWOOD, OF BOSTON, MASSACHUSETTS.

IMPROVEMENT IN INDIA-RUBBER SURGICAL TUBES.

Specification forming part of Letters Patent No. 204,905, dated June 18, 1878; application filed May 13, 1878.

*To all whom it may concern:*

Be it known that I, RHODES LOCKWOOD, of Boston, county of Suffolk, State of Massachusetts, have invented an Improvement in India-Rubber Surgical Tubes, of which the following is a specification:

Surgical tubes, such as catheters, stomach-tubes, &c., having eyes or openings for the passage of a fluid through them, are now made commonly of vulcanized rubber, and the eyes are cut through or into them after the tubes are vulcanized; but such tubes are objectionable, because of the square corners formed by cutting the eyes, causing irritation. In Patent No. 191,879 these india-rubber tubes are made in glass molds, having depressions corresponding in size with and located opposite the place where the eyes are to be formed, such depressions in the glass mold making corresponding depressions in the india-rubber tubes, which serve (when the bottoms of the eyes are removed by means of a metal rod inserted into the rubber tubes) as the eyes for such india-rubber tubes. This last method results in the production of eyes rounded from the extreme outside to the extreme inside of the tube, and the method is not so well adapted for the formation of small as of large eyes.

In this my invention I form the tube in a mold in the usual manner, such mold being provided with a flattened portion, which flattens a portion of the exterior of the india-rubber tube on one side near its end, into and through which flattened portion the eye may be cut by a knife from the outside of the tube into it, leaving square edges at the eye. In this way the size of the eye is not fixed when the tube is vulcanized, and consequently the eye may be cut to any desired width or size in any sized tube, according to the quantity of material to be passed through the tube, and the usual injurious and unpleasant effects resulting from the usual square eye are avoided.

In all tubes of this class heretofore made the rubber of which they have been formed has been of the same kind, and the finished tube has been of the same uniform flexibility from one to the other end. Such tubes have frequently to be retained in the person for a greater or less time, which is very difficult to do, because of their flexibility. To make these tubes so that they may be easily retained in place when held by their outer ends or tied through the holes common to the outer end of such tubes, I have made the outer end of the tubes of hard rubber for a distance of about three inches, more or less.

I have demonstrated by experiments that an india-rubber compound prepared as for soft rubber and an india-rubber compound prepared as for hard rubber (the two compounds differing chiefly in the proportion of sulphur employed) may be placed together side by side in a mold, or be lapped, laid, or spread one upon or next to or over or under the other, and be simultaneously vulcanized at the same degree of heat, and that the article or articles so vulcanized from the two compounds so joined and inclosed in the mold will, when finished, produce articles composed in parts of hard and soft rubber without seams or joints between them.

My invention further consists in a surgical tube composed of hard and soft rubber.

Figure 1 represents one of my improved tubes; Figs. 2 and 3, the entering end of such tube in two different positions, and Fig. 4 a cross-section through the eye.

The tube shown in the drawings is composed, that part of it marked $a$, of soft rubber, and that part marked $b$ of hard rubber, such parts being joined at $c$ as one piece without seam. To form such tube, a rubber compound containing the usual amount of sulphur for soft-rubber goods, lapped or matched at $c$, with a rubber compound such as used for the production of hard rubber, it containing more sulphur, is placed in an ordinary mold, and the two compounds are subjected to the action of heat, which, as the rubber is treated in the usual way, results in the production of a tube one part of which is soft, while the other part is hard.

To form the eye near the end of the tube, a depression is formed in the mold, which will form in the tube the depression $d$, and through the flattened face of such depression, whenever desired, an eye, $e$, of any suitable width and length, may be cut; but, owing to the fact of the eye being cut from the outside of the tube toward its center at the flattened portion $d$, the usual square corners are not found to be objectionable, as is the case with all eyes cut from the outside of a cylindrical part of a tube.

The holes $h$ at the outer end of the tube, made in the hard-rubber portion, permit the tube to be tied to the person in the usual way.

I claim—

1. An india-rubber surgical tube provided with a flattened portion, $d$, at or near its end, and with an eye cut through such portion from the exterior to the interior of the tube, substantially as described.

2. An india-rubber surgical tube composed of hard and soft rubber, substantially as described.

In testimony whereof I have signed my name to this specification in the presence of two subscribing witnesses.

RHODES LOCKWOOD.

Witnesses:
G. W. GREGORY,
N. E. WHITNEY.